UNITED STATES PATENT OFFICE 2,519,411

α - PHENYL - α - (4 - QUINOLYL)ACETONITRILES AND METHOD FOR THEIR PREPARATION

Alexander R. Surrey, Albany County, and Royal A. Cutler, Rensselaer County, N. Y., assignors to Sterling Drug Inc., Wilmington, Del., a corporation of Delaware No Drawing. Application May 28, 1948, Serial No. 29,938

10 Claims. (Cl. 260—283)

This invention relates to substituted-acetonitriles and to a process of preparing the same.

More particularly the substituted-acetonitriles of our invention are alpha-aryl-alpha-(4-quinolyl)acetonitriles of the formula QCH(A)CN where Q is a 4-quinolyl radical and A is an aryl radical. These compounds are useful as intermediates in the preparation of pharmaceuticals.

In the above formula the aryl radical, designated as A, is one of preferably 6–10 carbon atoms. The aryl radical can be substituted by such groups as hydroxyl; alkoxyl such as methoxyl, ethoxyl, etc.; dialkylamino such as dimethylamino; halogen such as chloro, bromo, or iodo; lower alkyl such as methyl, ethyl, butyl, etc.; and other groups which the chemist appreciates will be unaffected by the reaction conditions used in the preparation of the basic compounds of our invention.

It is to be understood that the term "a 4-quinolyl radical" (designated as Q) as used in this specification and in the appended claims is generic, and includes 4-quinolyl radicals wherein the quinoline nucleus may be substituted by one or more of such groups as: halo, including chloro, bromo, iodo, and fluoro; lower alkyl, including methyl, ethyl, propyl, amyl, and the like; hydroxy; lower alkoxy, including methoxy, ethoxy, propoxy, and the like; aryloxy, such as phenoxy; aralkoxy, such as benzyloxy; trihaloalkyl, such as trifluoromethyl; nitro; amino; substituted-amino, such as acetylamino, ethylamino, dimethylamino, benzylamino, and the like; and other substituents.

As illustrative of our invention the following specific compounds are presented:

(1) Alpha - (3 - ethoxyphenyl) - alpha - (6 - methoxy - 4 - quinolyl)acetonitrile,

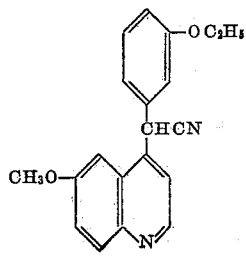

(2) Alpha-(3,4-dichlorophenyl)-alpha-(6,8-dichloro-4-quinolyl)-acetonitrile,

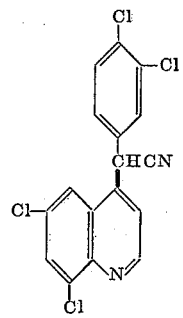

(3) Alpha - phenyl - alpha - (4 - quinolyl) - acetonitrile,

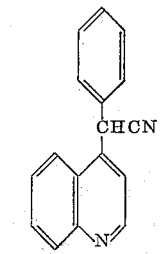

(4) Alpha - (3,4 - dimethoxyphenyl) - alpha - (3 - methyl - 8 - iodo - 4 - quinolyl) - acetonitrile,

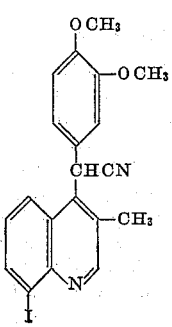

(5) Alpha - phenyl - alpha - (3 - nitro - 4 - quinolyl) acetonitrile,

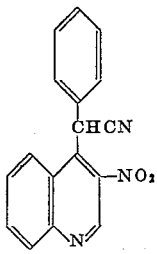

(6) Alpha - (4 - methylphenyl) - alpha - (3,6,7-trimethyl - 4 - quinolyl) - acetonitrile,

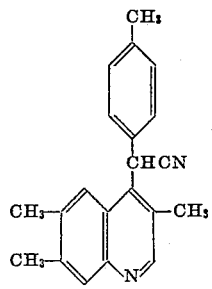

(7) Alpha-(4 - dimethylaminophenyl) - alpha-(7-phenoxy-4-quinolyl)-acetonitrile,

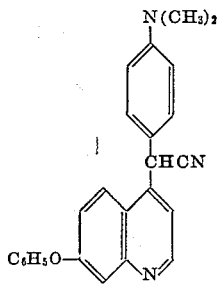

(8) Alpha-phenyl-alpha-(7 - chloro - 4 - quinolyl) acetonitrile,

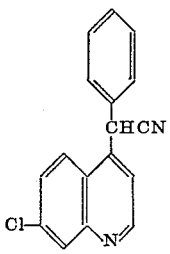

Our invention further comprehends a process for preparing the above compounds. This process involves the condensation of a 4-haloquinoline of the formula Q-halogen with an arylacetonitrile of the formula ACH₂CN in the presence of a strong base to yield an alpha-aryl-alpha-(4-quinolyl) acetonitrile of the formula

QCH(A)CN where Q and A have the meanings hereinabove described. For example, alpha-phenyl-alpha-(5-chloro-4-quinolyl) acetonitrile is prepared by condensing phenylacetonitrile with 4,5-dichloroquinoline in the presence of sodium amide. Other basic condensing agents, e. g. potassium amide, sodium hydride, phenyllithium, and the like, can be used in place of sodium amide. We prefer to use sodium amide as the strong base because of its availability and low cost. We found that excellent results were obtained in this condensation when about two moles of sodium amide and two moles of arylacetonitrile were employed per one mole of 4-haloquinoline in benzene as the solvent with the reaction temperature being kept below 35° C. The condensation can also be run using other ratios of reactants, or higher reaction temperatures, but with a sacrifice in yields. Further, solvents other than benzene, such as toluene, xylene, ether, dioxane, and the like can be used.

The intermediate 4-haloquinolines are generally well known to those skilled in the art; for representative literature references see: Surrey et al., J. Am. Chem. Soc. 68, 113, 1244, and 2570 (1946); Steck et al., ibid. 129, 132, 380 and 1241 (1946); Riegel et al., ibid. 1229; Baker et al., ibid. 1267; Mosher et al., ibid. 69, 303 (1947); Bachman et al., ibid. 365; Snyder et al., ibid. 371; and Clinton et al., ibid. 704. Some 4-haloquinolines that are useful intermediates in the preparation of the compounds of our invention are listed as follows:

3,4-dichloroquinoline
3,4,5-trichloroquinoline
3,4,7-trichloroquinoline
3-bromo-4-chloroquinoline
3-bromo-4,7-dichloroquinoline
3-iodo-4-chloroquinoline
3-iodo-4,5-dichloroquinoline
4,5,6-trichloroquinoline
4,5,7-trichloroquinoline
4,6,8-trichloroquinoline
4,7,8-trichloroquinoline
4-chloro-5,7-dibromoquinoline
3-methyl-4-chloro-7-iodoquinoline
3-methyl-4-chloro-8-iodoquinoline
3-methyl-4,5-dichloroquinoline
3-methyl-4,7-dichloroquinoline
3-methyl-4-chloro-7-bromoquinoline
3-methyl-4-chloro-6-bromoquinoline
3-methyl-4-chloro-6-ethoxyquinoline
3,6-dimethyl-4-chloroquinoline
3-methyl-4,8-dichloroquinoline
6-methyl-4-chloro-8-methoxyquinoline
3,8-dimethyl-4-chloroquinoline
4,7-dichloroquinoline
4-chloro-7-bromoquinoline
4-chloro-7-iodoquinoline
4,7-dichloro-6-methoxyquinoline
4,5-dichloroquinoline
3-nitro-4-chloroquinoline
3-amino-4-chloroquinoline
4-chloro-7-fluoroquinoline
4-chloro-7-trifluoromethylquinoline
4,7-dichloro-5-methoxyquinoline
4-chloro-7-phenoxyquinoline
3,4-dibromoquinoline
4-chloro-6-nitroquinoline The following examples will further illustrate specific embodiments of our invention.

*Examples*

*Alpha-aryl-alpha-(4 - quinolyl) acetonitriles.*—The alpha - aryl - alpha - (4 - quinolyl) acetonitriles designated as QCH(A)CN hereinabove are prepared by condensing a 4-haloquinoline with an arylacetonitrile in the presence of a strong base. The following procedure where aryl is phenyl is illustrative of this method: 110 g. (2.6 moles) of sodium amide is added to a well stirred, ice-cooled solution of 260 g. (2.2 moles) of phenylacetonitrile in one liter of dry benzene contained in a flask fitted with a soda-lime tube. The temperature rises gradually to 35° C. with the color of the solution changing from a pale yellow to a deep reddish-black. After stirring for an hour, one mole of the 4-haloquinoline (preferably where halo is chloro because of ease of preparation) is added in small portions at a rate sufficient to maintain the temperature at 25–30° C. with strong external cooling. After the addition has been complete, the ice bath is removed and the reaction mixture stirred at room temperature for two hours. The bright red sodium salt of the product and unchanged sodium amide are decomposed by the cautious dropwise addition of water. The light reddish-orange benzene layer is washed once with water followed by extraction with dilute hydrochloric acid. Ice is added to the acid extracts and the free base liberated by the addition of concentrated ammonium hydroxide. In some preparations the product separates as a solid at this stage and is collected by filtration. In other preparations the free base separates as an oil which is taken up in an appropriate solvent such as chloroform, and the resulting solution dried over anhydrous calcium sulfate. Removal of the solvent by distillation yields a viscous oil which, on triturating with a solvent such as ether, solidifies in most instances. When such treatment does not yield a solid, the oil is distilled in vacuo, and the resulting distillate crystallizes when triturated with a solvent such as a mixture of ether and n-pentane. The crude solids are obtained in practically quantitative yields and are used in subsequent reactions without further purification. Analytical samples are obtained by recrystallization from petroleum ether. The following compounds are prepared in the above manner.

*Alpha-phenyl-alpha-(4-quinolyl) acetonitrile.*—The reactants are 4-chloroquinoline and phenylacetonitrile. The crude oil after the removal of chloroform is distilled at 0.1 micron, B. p. 140° C. The distillate which crystallizes from a mixture of n-pentane and ether is alpha-phenyl-alpha-(4-quinolyl) acetonitrile, M. P. 86–86.5° C.

The same compound is obtained when 4-bromoquinoline is substituted for 4-chloroquinoline.

*Alpha - phenyl - alpha - (5 - chloro - 4 - quinolyl) acetonitrile.*—The reactants are 4,5-dichloroquinoline and phenylacetonitrile. The crude product separates as a pale yellow solid on addition of concentrated ammonium hydroxide to the acidic extract. Recrystallization of this product from petroleum ether yields alpha-phenyl-alpha-(5-chloro-4-quinolyl) acetonitrile, M. P. 149.5–150.5° C.

*Alpha - phenyl - alpha - (7 - chloro - 4 - quinolyl) acetonitrile.*—The reactants are 4,7-dichloroquinoline and phenylacetonitrile. A crude viscous oil which remains after removal of the chloroform crystallizes on triturating with ether. Recrystallization of this crystalline material from petroleum ether yields alpha-phenyl-alpha-(7-chloro-4-quinolyl) acetonitrile, M. P. 117.5–118.5° C.

Using the above procedure but employing other 4-haloquinolines and other arylacetonitriles, corresponding alpha-aryl-alpha-(4-quinolyl) acetonitriles are formed. The following compounds are illustrative: alpha-(4-chlorophenyl)-alpha-(6,8-dichloro-4-quinolyl) acetonitrile from 4-chlorophenylacetonitrile and 4,6,8-trichloroquinoline; alpha - (3,4 - dichlorophenyl) - alpha - (3 - nitro-4-quinolyl) acetonitrile from 3,4-dichlorophenylacetonitrile and 3-nitro-4-chloroquinoline; alpha - (4 - methoxyphenyl) - alpha - (6 - methoxy-4-quinolyl) acetonitrile from 4-methoxyphenylacetonitrile and 4-chloro-6-methoxyquinoline, and the like.

The conversion of the hereinabove disclosed alpha-aryl-alpha-(4-quinolyl) acetonitriles into corresponding esters and amides is described in our copending application Serial Number 29,937, filed May 28, 1948.

We claim:

1. A compound of the formula

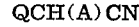

where Q is a 4-quinolyl radical and A is an aryl radical of the benzene series.

2. A compound of the formula

where Q is a 4-quinolyl radical.

3. Alpha - phenyl - alpha - (5 - chloro - 4 - quinolyl) acetonitrile.

4. Alpha - phenyl - alpha - (7 - chloro - 4 - quinolyl) acetonitrile.

5. Alpha - phenyl - alpha - (4 - quinolyl) acetonitrile.

6. A process for preparing a compound of the formula

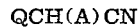

where Q is a 4-quinolyl radical and A is an aryl radical of the benzene series, which comprises reacting an alpha-arylacetonitrile of the formula ACH₂CN with a 4-haloquinoline of the formula Q-halogen in the presence of a strong base.

7. A process for preparing a compound of the formula

where Q is a 4-quinolyl radical, which comprises reacting phenylacetonitrile with a 4-haloquinoline of the formula Q-halogen in the presence of a strong base.

8. A process for preparing alpha-phenyl-alpha-(5-chloro-4-quinolyl) acetonitrile which comprises reacting phenylacetonitrile with 4,5-dichloroquinoline in the presence of sodium amide.

9. A process for preparing alpha-phenyl-alpha-(7-chloro-4-quinoline) acetonitrile which comprises reacting phenylacetonitrile with 4,7-dichloroquinoline in the presence of sodium amide.

10. A process for preparing alpha-phenyl-alpha-(4-quinolyl) acetonitrile which comprises reacting phenylacetonitrile with 4-chloro-quinoline in the presence of sodium amide.

ALEXANDER R. SURREY.
ROYAL A. CUTLER.

REFERENCES CITED

The following references are of record in the file of this patent:

UNITED STATES PATENTS

| Number | Name | Date |
| --- | --- | --- |
| 2,345,094 | Brooker et al. | Mar. 28, 1944 |